US012715188B2

(12) United States Patent
DeVine

(10) Patent No.: US 12,715,188 B2

(45) Date of Patent: Aug. 25, 2026

(54) HIGH PERFORMANCE MULTI SPECTRAL COATED FREEFORM OPTICAL ELEMENTS

(71) Applicant: Dolby Laboratories Licensing Corporation, San Francisco, CA (US)

(72) Inventor: Titus Marc DeVine, Shingle Springs, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 256 days.

(21) Appl. No.: 18/291,912

(22) PCT Filed: Jul. 27, 2022

(86) PCT No.: PCT/US2022/038519

§ 371 (c)(1), (2) Date: Jan. 24, 2024

(87) PCT Pub. No.: WO2023/009621

PCT Pub. Date: Feb. 2, 2023

(65) Prior Publication Data

US 2024/0326363 A1 Oct. 3, 2024

Related U.S. Application Data

(60) Provisional application No. 63/226,657, filed on Jul. 28, 2021.

(30) Foreign Application Priority Data

Aug. 24, 2021 (EP) .................................... 21192732

(51) Int. Cl.

*B29D 11/00* (2006.01)
*G02B 3/02* (2006.01)

(Continued)

(52) U.S. Cl.

CPC .... *B29D 11/0073* (2013.01); *B29D 11/00865* (2013.01); *G02B 3/02* (2013.01); *B29K 2033/00* (2013.01); *B29K 2709/08* (2013.01)

(58) Field of Classification Search

None

See application file for complete search history.

(56) References Cited

U.S. PATENT DOCUMENTS 5,405,557 A * 4/1995 Kingsbury ....... B29D 11/00538 264/328.8
5,805,336 A * 9/1998 Dalzell .................... G02C 7/12 264/1.32

(Continued)

FOREIGN PATENT DOCUMENTS

CN 1731229 A 2/2006
CN 201233454 Y 5/2009

(Continued)

*Primary Examiner* — Robert E. Tallman

(57) ABSTRACT

A glass part to be made into a two-part freeform optical element is received. The glass part includes a precision freeform surface in a first specific spatial shape and a to-be-corrected surface. A non-glass material layer is added onto the to-be-corrected surface of the glass part to produce an accurate second surface in a second specific spatial shape. An optical coating is applied to the precision freeform surface of the glass part in the two-part freeform optical element.

15 Claims, 5 Drawing Sheets

(51) Int. Cl.

| | |
|---|---|
| *B29K 33/00* | (2006.01) |
| *B29K 709/08* | (2006.01) |

(56) References Cited

U.S. PATENT DOCUMENTS 8,467,133 B2 6/2013 Miller
8,477,425 B2 7/2013 Border
8,629,930 B2 1/2014 Brueckner
8,814,691 B2 8/2014 Haddick
8,827,446 B2 9/2014 Iyer
9,107,624 B2 8/2015 Darty
9,128,281 B2 9/2015 Osterhout
9,310,610 B2 4/2016 Border
9,733,488 B2 * 8/2017 Ambler .................... G02C 7/00
9,759,917 B2 9/2017 Osterhout
9,897,886 B2 * 2/2018 Mack ................. G02B 27/0172
10,088,685 B1 10/2018 Aharoni
10,540,812 B1 1/2020 Yildiz
10,565,797 B2 2/2020 Nissinen
10,628,950 B2 4/2020 Price
10,726,574 B2 7/2020 Ninan
10,732,032 B2 8/2020 Pacala
10,816,702 B2 10/2020 Sutherland
10,881,287 B1 1/2021 Ouderkirk
11,092,491 B1 8/2021 Powell
2005/0043430 A1 * 2/2005 Weber ............... B29C 66/73921 522/117
2005/0104240 A1 * 5/2005 Jethmalani .............. G02C 7/02 356/124
2008/0180803 A1 * 7/2008 Seybert ............ B29D 11/00653 428/423.7
2011/0102562 A1 5/2011 Johnson, Jr.
2011/0292346 A1 12/2011 Fok
2012/0229754 A1 9/2012 Iyer
2013/0162505 A1 6/2013 Crocco
2013/0329184 A1 * 12/2013 Barzak ............... B29D 11/0073 264/1.32
2017/0010465 A1 * 1/2017 Martinez ................ G02C 11/10
2017/0090194 A1 3/2017 Hayes
2017/0219826 A1 8/2017 Haseltine
2017/0316762 A1 11/2017 El-Ghoroury
2018/0182174 A1 6/2018 Choi
2018/0295351 A1 10/2018 Ninan
2020/0103659 A1 4/2020 Ouderkirk
2023/0305310 A1 9/2023 Ninan

FOREIGN PATENT DOCUMENTS

CN 1973552 B 10/2010
CN 101950096 A 1/2011
CN 106598260 A 4/2017
CN 107148592 A 9/2017
CN 107632406 A 1/2018
CN 108474959 A 8/2018
CN 109477916 A 3/2019
CN 109525832 A 3/2019
CN 110806643 A 2/2020
EP 3258305 A1 12/2017
JP 2009067333 A 4/2009
JP 2010197917 A 9/2010
JP 2014021389 A 2/2014
JP 2014153545 A 8/2014
JP 2017125886 A 7/2017
JP 2019194705 A 11/2019
KR 20200046961 A 5/2020
RU 172721 U1 7/2017
TW 200825608 A 6/2008
WO 2012037290 A2 3/2012
WO 2020035206 A1 2/2020
WO 2020263865 A1 12/2020

* cited by examiner receive a glass part to be made into a two-part freeform optical element 402 add a non-glass material layer onto the to-be-corrected surface of the glass part 404 apply an optical coating to the precision freeform surface of the glass part in the two-part freeform optical element 406

Figure 5:
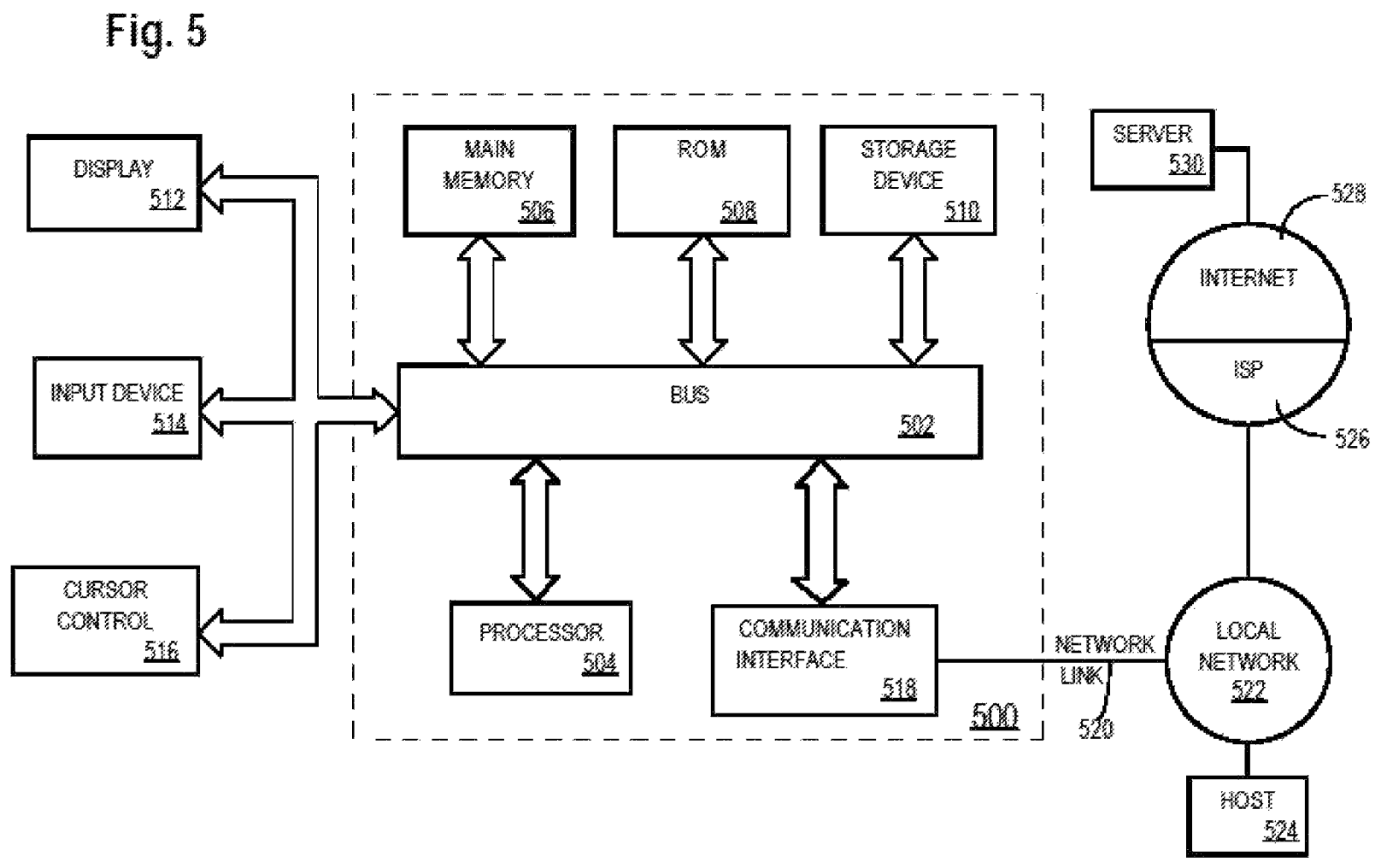

MAIN MEMORY 506
ROM 508
STORAGE DEVICE 510
BUS 502
PROCESSOR 504
COMMUNICATION INTERFACE 518
500
NETWORK LINK 520
LOCAL NETWORK 522
HOST 524
ISP 526
INTERNET 528
SERVER 530
DISPLAY 512
INPUT DEVICE 514
CURSOR CONTROL 516

HIGH PERFORMANCE MULTI SPECTRAL COATED FREEFORM OPTICAL ELEMENTS

CROSS-REFERENCE TO RELATED APPLICATION

This application is a U.S. National Stage application under U.S.C. 371 of International Application No. PCT/US2022/038519, filed on Jul. 27, 2022, which claims the priority benefit of U.S. Provisional Patent Application No. 63/226,657, filed 28 Jul. 2021, and European Patent Application No. 21192732.2, filed Aug. 24, 2021, each of which is incorporated herein in its entirety.

TECHNOLOGY

The present invention relates generally to optical elements, and in particular, to high performance multi spectral coated freeform optical elements.

BACKGROUND

Content such as those related to mixed reality (MR), virtual reality (VR), augmented reality (AR), computer gaming, image/video display applications, and so on, may be visually presented through a wearable or non-wearable device such as a head-mounted MR, AR or VR display device to a user. It is technically challenging to integrate various complex electronic and optoelectronic components into a display device with a small footprint, light weight and a reasonable cost.

Freeform (e.g., non-planar, non-spherical, etc.) optical elements may be incorporated in these devices to help achieve high performance in image rendering and seeing/passing through operations. Precision freeform machining and polishing can be used to produce accurate freeform optical glass elements. However, equipment and investment in a precision freeform machining and polishing glass fabrication process are expensive and not scalable with expected production volumes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4 illustrates an example process flow; and

FIG. 5 illustrates an example hardware platform on which a computer or a computing device as described herein may be implemented.

DESCRIPTION OF EXAMPLE POSSIBLE EMBODIMENTS

Figure 1:
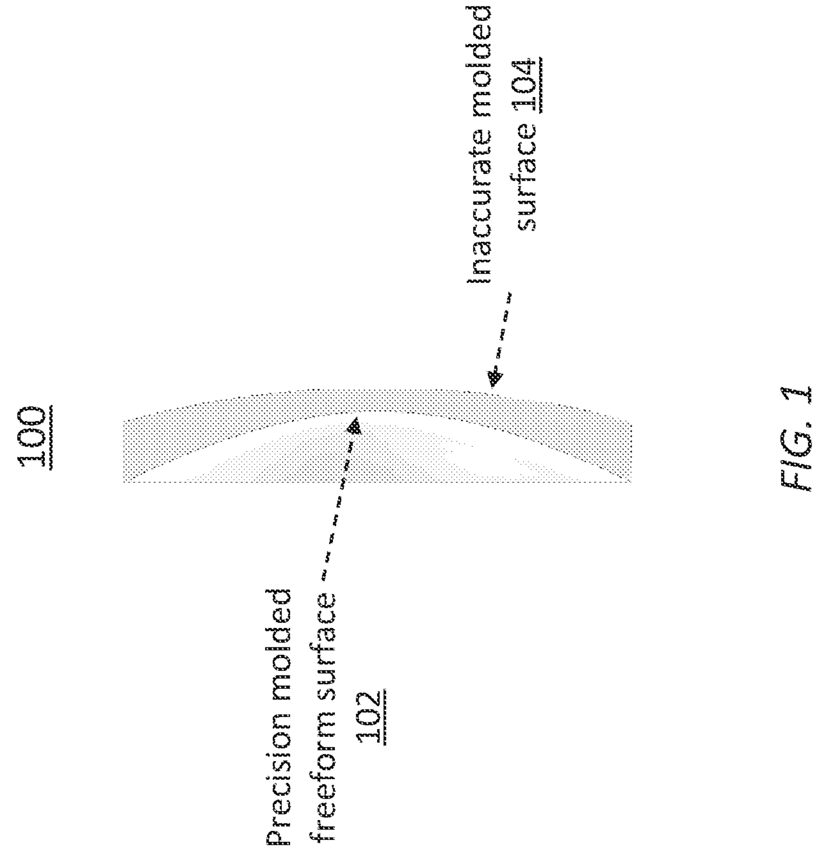
FIG. 1 illustrates a first example glass blank.

Example possible embodiments, which relate to high performance multi spectral coated freeform optical elements, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. GLASS BLANKS AND FREEFORM OPTICAL ELEMENTS
3. GLASS MOLDING
4. GLASS POLISHING
5. OVER-MOLDING AND COATING
6. EXAMPLE PROCESS FLOWS
7. EXAMPLE COMPUTER SYSTEM IMPLEMENTATION
8. EQUIVALENTS, EXTENSIONS. ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follow below.

Example embodiments described herein relate to producing two-part freeform optical elements. A glass part to be made into a two-part freeform optical element is received. The glass part includes a precision freeform surface in a first specific spatial shape and a to-be-corrected surface. A non-glass material layer is added onto the to-be-corrected surface of the glass part to produce an accurate second surface in a second specific spatial shape. An optical coating is applied to the precision freeform surface of the glass part in the two-part freeform optical element.

Example embodiments described herein relate to display systems incorporating two-part freeform optical elements. Such a display system comprises a device image display that outputs device display light for rendering device display images: an optical configuration to see through transmissive light and to perform wavelength selection with respect to the device display light. The optical configuration includes a two-part freeform optical element produced under techniques as described herein.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Glass Blanks and Freeform Optical Elements

Techniques as described herein can be implemented with a wide variety of industry standard or proprietary glass optic production techniques to produce, fabricate or provide freeform optical elements with precision freeform surfaces. As used herein, the terms precision (e.g., molded, polished, etc.) freeform surface refers to a specifically designated or designed surface, within error tolerances or maximum error thresholds, possessed by or formed on a freeform optical element that is to be incorporated into a wearable device for image rendering and/or seeing/passing through purposes. Accuracy or precision of such a freeform surface enables the wearable device to render images with no or little optics induced visual distortions or artifacts.

Glass molding can be used to produce or fabricate glass blanks. Such a glass blank may be of a spatial form such as an optical lens having two opposing surfaces on each side of the glass blank. One or both surfaces of the glass blank outputted from a glass molding process may not be precision freeform surface. Initial investments or costs for equipment and tooling to implement the glass molding process can be relatively high. However, after the equipment, tooling and the glass molding process are developed, per-part (or per-glass-blank) costs are relatively low and scale with production volume at relatively low costs. One of the two surfaces of a glass blank outputted from the glass molding process may be (relatively) highly accurate, while the other of the two surfaces may not be (relatively) highly accurate but rather need to be further or post polished or fabricated in order to produce a (relatively) highly accurate spatial form to meet specification or designed goals. The glass blanks outputted from the glass molding processing can be further or post processed with an ophthalmic fabrication/polishing process and/or an (e.g., acrylate material, polyacrylate material, polymer material, transparent plastics, etc.) over-molding process.

Initial glass blanks can be produced or fabricated from a glass molding process that molds the initial glass blanks having surfaces that assume or approximate base curves. These base curves serve or represent initial curve forms to be further processed or fabricated into final spatial forms to meet specification or design goals. For example, the initial glass blanks can be bulk polished in an ophthalmic polishing process to have a surface polished to a precision freeform surface or shape to meet specification or design goals. Similar to glass molding process, initial investments or costs for equipment and tooling to implement the ophthalmic polishing process can be relatively high. However, after the equipment, tooling and the glass molding process are developed, per-part (or per-glass-blank) costs are relatively low and scale with production volume at relatively low costs. Depending on glass blank availability and molding capability, a polishing process as described herein can be used to produce or fabricate freeform optical elements relatively fast with or without RX prescriptions.

3. Glass Molding

FIG. 1 illustrates a first example (e.g., pre-over-molded, etc.) glass blank 100 produced or fabricated with a precision glass molding method. The glass blank (100) may be subsequently over-molded or converted into a freeform optical element with (e.g., all, etc.) precision freeform surfaces at least one of which is converted from and is different from an initial or non-freeform surface of the glass blank (100).

The precision glass molding method used to produce or fabricate the glass blank (100) may generate or produce some but not all precision freeform surfaces on the glass blank (100). As shown in FIG. 1, the glass blank (100) has a first surface that is a precision molded freeform surface 102 and a second surface that is an inaccurate molded surface 104. The precision molded freeform surface (102) may represent an interior surface of the freeform optical element near a user/viewer's eyes in operational scenarios in which the freeform optical element has been incorporated into a wearable device worn by the user/viewer. The inaccurate molded surface (104) may represent an exterior surface of the freeform optical element away from the user/viewer's eyes in these operational scenarios.

The inaccurate molded surface (104) of the glass blank (100) may be a planar surface, a spherical surface or a surface with a base curve form (that allows for further spatial form modification) that is different or deviating from a corresponding designed precision freeform surface of the freeform optical element.

The inaccurate molded surface (104) of the glass blank (100) may be converted or over-molded into the corresponding designed precision freeform surface of the freeform optical element. The precision molded freeform surface (102) and the corresponding designed precision freeform surface into which the inaccurate molded surface (104) is converted represent or constitute some or all viewing surfaces provided by the freeform optical element. The viewing surfaces of the freeform optical element may individually and collectively cover viewing directions of some or all portions of a vision field of a user/viewer wearing the wearable device in connection with one of MR, VR, AR, computer gaming, image/video display applications, and so on.

As used herein, a viewing surface of a freeform optical element refers to a surface (of the freeform optical element) through or from which image rendering and/or seeing/passing through light—to be perceived by the user/viewer—generated by a wearable device incorporating the freeform optical element is designated to transmit or reflect.

4. Glass Polishing

Figure 2:
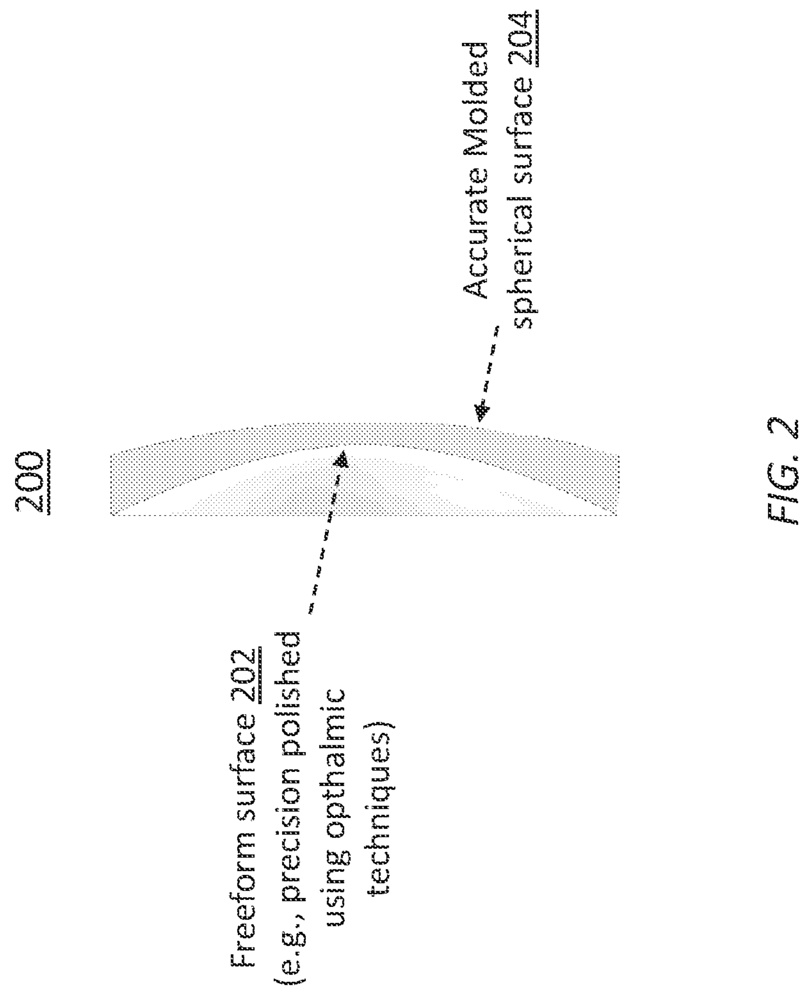
FIG. 2 illustrates a second example glass blank.

FIG. 2 illustrates a first example (e.g., pre-over-molded, etc.) glass blank 200 produced or pre-fabricated with a precision glass molding method and then polished with a precision glass polishing method similar to polishing methods used in ophthalmic practices. The glass blank (200) may be subsequently over-molded or converted into a freeform optical element with (e.g., all, etc.) precision freeform surfaces at least one of which is converted from and is different from an initial or non-freeform surface of the glass blank (200).

The precision glass molding method used to produce or pre-fabricate an initial glass blank (not shown) may generate or produce no precision freeform surfaces on the initial glass blank. In some operational scenarios, the precision glass molding method may generate two initial surfaces on the initial glass blank one of which initial surfaces is polished by the precision glass polishing method into a third surface that is a (precision polished) freeform surface 202, and other of which initial surface is a fourth surface that is an accurate molded spherical surface 204. As shown in FIG. 2, the accurate molded spherical surface (204) remains on the glass blank (200) after the precision glass polishing method is performed to generate or produce the precision polished freeform surface (202).

The precision polished freeform surface (202) may represent an interior surface of the freeform optical element near a user/viewer's eyes in operational scenarios in which the freeform optical element has been incorporated into a wearable device worn by the user/viewer. The accurate molded spherical surface (204) may represent an exterior surface of the freeform optical element away from the user/viewer's eyes in these operational scenarios and is different or deviating from a corresponding designed precision freeform surface of the freeform optical element.

The accurate molded spherical surface (204) of the glass blank (200) may be converted or over-molded into the corresponding designed precision freeform surface of the freeform optical element. The precision polished freeform surface (202) and the corresponding designed precision freeform surface into which the accurate molded spherical surface (204) is converted represent or constitute some or all viewing surfaces provided by the freeform optical element. The viewing surfaces of the freeform optical element may individually and collectively cover viewing directions of some or all portions of a vision field of a user/viewer wearing the wearable device in connection with one of MR, VR, AR, computer gaming, image/video display applications, and so on.

Glass can be used to produce relatively high quality multi-layer dielectric coatings with industry standard or proprietary coating processes. These glass coating processes are well defined and relatively efficiently scale with production volume at relatively low costs. As the multi-layer coatings can be coated on glass surfaces at a relatively high temperature with relatively high quality and high adhesion, failure rates and/or dropout rates can be relatively low.

In contrast, plastics can be used to produce relatively low quality coatings with industry standard or proprietary coating processes. As the coatings are coated on plastic surfaces at a relatively low temperature with relatively low quality and low adhesion, failure rates and/or dropout rates can be relatively high.

As used herein, failure rates may be used to measure rates of failures in freeform optical elements or of wearable devices including the freeform optical elements, for example because of noticeable optics induced visual distortions/artifacts in image rendering and/or seeing/passing through operations caused by inaccurate molded/polished surfaces and/or optical property changes or deteriorations in coatings of the freeform optical elements. Dropout rates may be used to measure rates of users/viewers dropping out from using freeform optical elements or wearable devices including the freeform optical elements, for example because of noticeable optics induced visual distortions/artifacts in image rendering and/or seeing/passing through operations caused by inaccurate molded/polished surfaces and/or optical property changes or deteriorations in coatings of the freeform optical elements.

It is noted that plastics can be used to produce relatively high quality anti-reflection coatings with industry standard or proprietary coating processes. These plastics coating processes are well defined and relatively efficiently scale with production volume at relatively low costs. As the anti-reflection coatings can be coated on plastic surfaces at a relatively low temperature with relatively high quality and high adhesion, failure rates and/or dropout rates can be relatively low.

Under some approaches that do not implement techniques as described herein, due to the limitations of fabrication processes of glass optical elements, the glass optical elements or surfaces thereof may only be simple low accuracy meniscus shapes with little to no precision freeform surface shape. Even if coatings are made on these inaccurate shapes or surfaces, and even if light transmission with these glass optical elements may be acceptable notwithstanding these inaccurate shapes or surfaces, light reflection with these glass optical elements is prone to generate incorrect imagery with relatively easily perceived visual distortions.

Under some other approaches that do not implement techniques as described herein, plastic optical elements can be produced or fabricated with accurate surfaces or shapes. While high quality anti-reflection coatings can be made onto the plastic optical elements, other coatings such as spectral-multiplexed (or wavelength selective) coatings used to support see-through and spectral-multiplexing based imaging solutions may be made only at a temperature higher than what the plastic optical elements are able to maintain their spatial forms. Even if the spectral-multiplexed coatings are made on these plastic optical elements, such coatings cannot achieve relatively high quality, relative strong and lasting adhesion, relative low failure and dropout rates, etc. In addition, due to temperature-induced shape distortions these plastic optical elements may suffer, light reflection/transmission with these plastic optical elements is prone to generate incorrect imagery with relatively easily perceived visual distortions.

In sharp contrast, techniques as described herein can be used to support (relatively high) volume fabrication of freeform optical elements with precision (e.g., molded, polished, etc.) glass freeform surfaces. These freeform optical elements may be included or incorporated into see-through and spectral-multiplexing based imaging systems to support MR, AR, VR, computer gaming, image/video display applications, and so on. Example see-through (or pass-through) and spectral-multiplexing based imaging systems are described in U.S. Provisional Patent Application No. 63/060,783, entitled "SYSTEM FOR OPTIMIZED SELECTIVE LIGHT PASS THROUGH." by Ajit Ninan et al., filed on 4 Aug. 2020, the entire contents of which are hereby incorporated by reference as if fully set forth herein.

The precision glass freeform surfaces on the freeform optical elements enable coatings—e.g., spectral-multiplexed coatings to support selective wavelength reflection/transmission in the see-through and spectral-multiplexing based imaging systems—to be made with relatively high temperature (e.g., above what plastic materials can maintain form integrity, etc.), relatively high quality, relative optimal, strong and lasting coating adhesion, relative low failure and dropout rates, etc., as compared with other approaches that do not implement techniques as described herein.

Spectral multiplexed coatings can be used in imaging systems to dramatically increase efficiency of transmissive/reflective light throughput, due to relatively high reflectivity in specific reflective light wavelength bands for reflective image rendering and/or seeing/passing through light and relatively high transmittance in specific transmissive light wavelength bands for transmissive image rendering and/or seeing/passing through light. In addition, these spectral multiplexed coatings can be used to reject reflective light not in the specific reflective light wavelength bands as well as reject transmissive light not in the specific transmissive light wavelength bands. Such light wavelength selectivity can enable the imaging system to support relatively accurate color matching (via specific optimized light wavelength matching/combination) and relatively low power usage/consumption/budget.

5. Over-Molding and Coating

Figure 3:
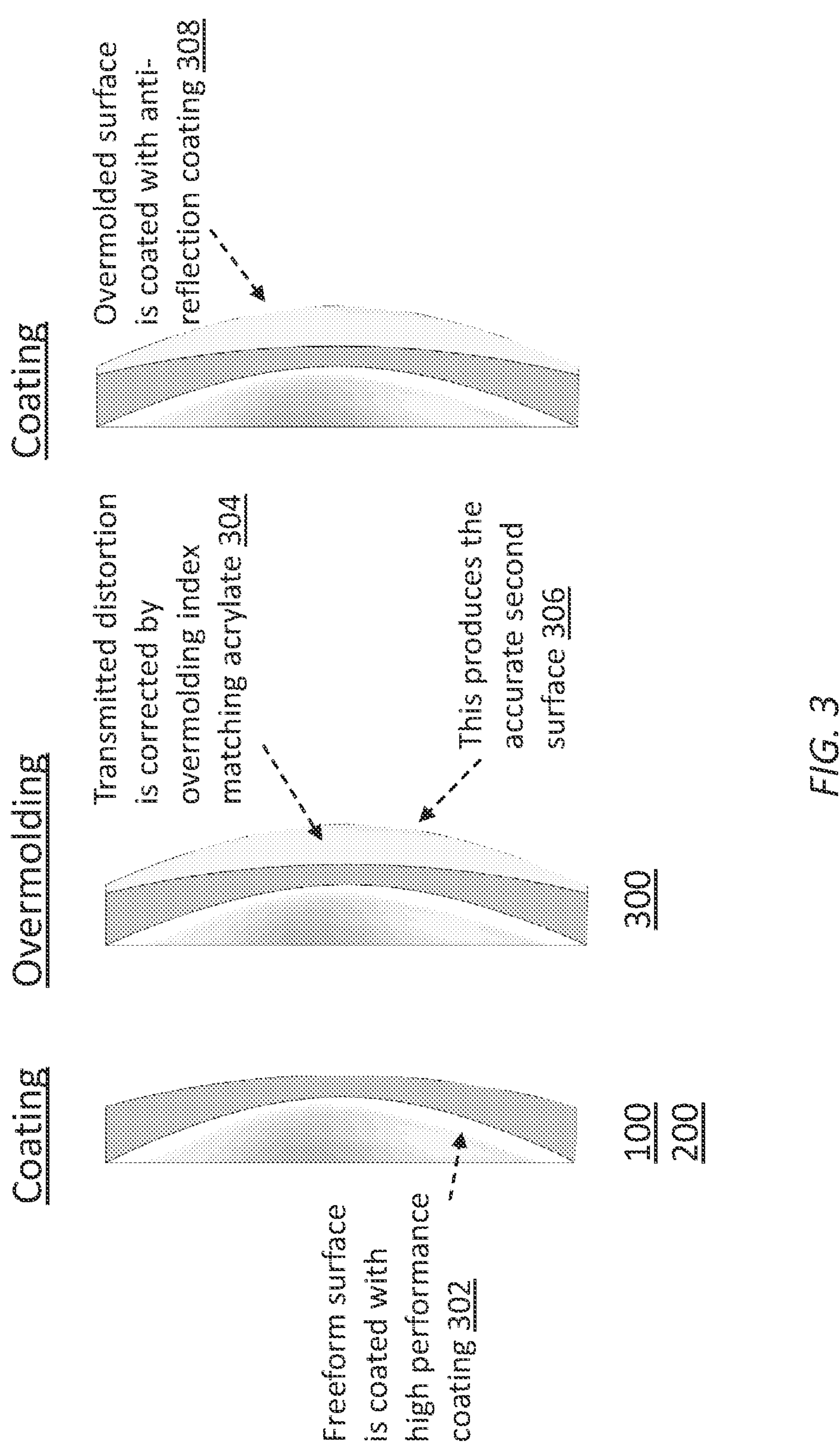
FIG. 3 illustrates an example workflow for producing and coating a two-part freeform optical element.

FIG. 3 illustrates an example workflow (or process flow) for producing and coating a two-part freeform optical element in a lens shape with two precision freeform surfaces on both sides of the lens shape. This workflow can be used in volume production at relatively low costs and high scalability.

By way of illustration but not limitation, one of the two precision freeform surfaces is a precision glass freeform surface coated with coatings (e.g., spectral-multiplexed coatings, etc.) that can be made on glass with applicable quality specification at relatively low costs but cannot be made on plastics with the applicable quality specification at relatively low costs. The other of the two precision freeform surfaces is a precision plastic freeform surface coated with coatings (e.g., anti-reflection coatings, etc.) that can be made on plastics with applicable quality specification at low costs.

The workflow initially receives (e.g., only, etc.) a glass part of the two-part freeform optical element. As shown in FIG. 3, the glass part of the two-part freeform optical element may be a glass blank (e.g., 100 of FIG. 1, 200 of FIG. 2, etc.) produced using industry standard or proprietary glass molding and/or polishing process(es). The glass part as received by the workflow includes a precision (polished or molded) glass freeform surface representing an interior surface closer (as compared with a surface on the opposing side of the glass part or the two-part freeform optical element) to a user/viewer after the two-part freeform is incorporated into an imaging system such as a wearable device operated or used by the user/viewer to view imagery rendered by transmissive and/or reflective light.

In the workflow as illustrated in FIG. 3, a first coating operation may be performed to coat the precision glass freeform surface with a relatively high performance coating 302. Example relatively high performance coatings may include, but are not necessarily limited to only, any of: a spectral-multiplexed coating, a coating made at a relatively high temperature, a coating made with a relatively high quality and strong coating adhesion on glass but not on non-glass optical element materials, etc.

In the same workflow, an over-molding operation may be performed to mold a different material—which may be referred to as a molding or over-molding material—other than the received glass part onto the glass part (100 or 200) to produce the two-part freeform optical element (referenced as 300 in FIG. 3) with an accurate second surface 306 in addition to the precision glass freeform surface. The accurate second surface (306) may represent a second precision freeform surface or an exterior surface of the two-part freeform optical element. The accurate second surface (306) is a correction surface produced by molding or over-molding the acrylate material (or a suitable transparent polymer or plastic material) onto the opposing surface to the precision glass freeform surface of the glass part (100 or 200). In some operational scenarios, the accurate second surface (306) is used as a non-reflective non-controlled (or non-wavelength-selective) surface of the two-part freeform optical element (300).

By way of example but not limitation, the molding material may be an over-molding index matching acrylate material 304 with an optical refractive index matching that of the glass part (100 or 200). Optical refractive index matching between the acrylate material (304) and the glass part (100 or 200) prevents transmissive light received by the accurate second surface (306) from being reflected at the boundary separating the acrylate material (304) and the glass part (100 or 200). As a result, relatively high transmissive light efficiency is increased or achieved by the two-part freeform optical element through optical refractive index matching. In addition, transmission distortion and related visual artifacts can be prevented or reduced by the accurate second surface (306) as compared with other approaches that generate meniscus shapes/surfaces prone to generate visual artifacts.

In the workflow as illustrated in FIG. 3, a second coating operation may be performed to coat the over-molded surface—or the accurate second surface (306)—with an anti-reflection coating 308, which further increases or enhances transmissive light efficiency of the two-part freeform optical element (300).

Additionally, optionally or alternatively, in some operational scenarios, the over-molding operation may be performed before the coating operations. Additionally, optionally or alternatively, in some operational scenarios, the first coating operation may be performed before or after the second coating operations. Additionally, optionally or alternatively, in some operational scenarios, multiple coatings can be made (e.g., in specific temporal order, in any temporal order, etc.) to one or both of the interior and exterior surfaces of the freeform optical element (300).

A non-glass material such as a transparent plastic (e.g., acrylate, polyacrylate, polymer, etc.) material may be molded or over-molded onto a glass part to correct a non-accurate (or non-precision) surface using any of a wide variety of over-molding methods, one-component injection molding methods, multi-material injection molding (MMM) methods, etc. The non-glass material at or near its melting point may be molded, over-molded and/or layer-added onto the glass part to bond or join with the glass part and fill any spatial voids, cavities, meniscus shapes on the non-accurate surface to generate an accurate surface such as a precision freeform surface meeting designated specification within maximum error margins or tolerances.

6. Example Process Flows

Figure 4:
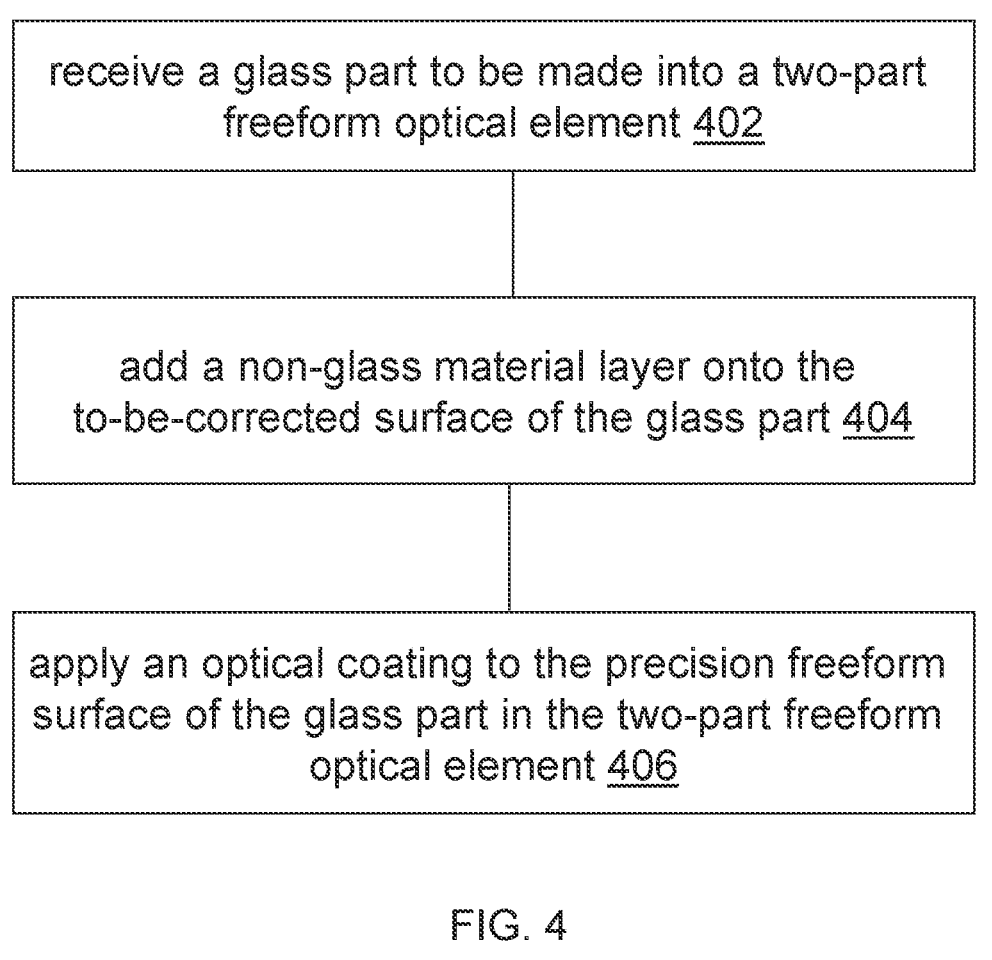

FIG. 4 illustrates an example process flow according to an embodiment. In some embodiments, the process flow or parts therein may be performed with one or more computing devices or components (e.g., an image rendering device, etc.). Block 402 comprises receiving a glass part to be made into a two-part freeform optical element. The glass part includes a precision freeform surface in a first specific spatial shape and a to-be-corrected surface.

Block 404 comprises adding a non-glass material layer onto the to-be-corrected surface of the glass part to produce an accurate second surface in a second specific spatial shape.

Block 406 comprises applying an optical coating to the precision freeform surface of the glass part in the two-part freeform optical element.

In an embodiment, the process flow further comprises applying a second optical coating to the accurate second surface of the two-part freeform optical element.

In an embodiment, the second optical coating represents an anti-reflection coating.

In an embodiment, the optical coating is coated at a temperature above what the non-glass material layer is able to maintain its spatial form.

In an embodiment, the optical coating represents a spectral-multiplexed coating.

In an embodiment, the non-glass material is of an optical refractive index matching that of the glass part.

In an embodiment, the two-part freeform optical element is incorporated into an imaging system used by a viewer.

In an embodiment, the imaging system represents a wearable device used to support seeing-through and spectral multiplexed imaging applications.

In an embodiment, the precision freeform surface represents an interior surface relative to the viewer; the accurate second surface represents an exterior surface relative to the viewer.

In an embodiment, the precision freeform surface is produced by a glass molding process.

In an embodiment, the precision freeform surface is produced by a glass polishing process.

In an embodiment, the two-part freeform optical element operates with an image rendering device to use light reflected from the precision freeform surface to render images in one of: a mixed reality application, an augmented reality application, a virtual reality application, a computer gaming application, a cinema display application, a video display application, etc.

In an embodiment, a display system comprises: a device image display that outputs device display light for rendering device display images: an optical configuration to see through transmissive light and to perform wavelength selection with respect to the device display light. The optical configuration includes a two-part freeform optical element produced under techniques as described herein.

In an embodiment, a computing device such as a display device, a mobile device, a set-top box, a multimedia device, etc., is configured to perform any of the foregoing methods or parts thereof. In an embodiment, an apparatus comprises a processor and is configured to perform any of the foregoing methods or parts thereof. In an embodiment, a non-transitory computer readable storage medium, storing software instructions, which when executed by one or more processors cause performance of any of the foregoing methods or parts thereof.

In an embodiment, a computing device comprising one or more processors and one or more storage media storing a set of instructions which, when executed by the one or more processors, cause performance of any of the foregoing methods or part thereof.

Note that, although separate embodiments are discussed herein, any combination of embodiments and/or partial embodiments discussed herein may be combined to form further embodiments.

7. Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic. ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example. FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506, Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Equivalents, Extensions, Alternatives and Miscellaneous

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for producing freeform optical elements, comprising:

receiving a glass part to be made into a two-part freeform optical element, wherein the glass part includes a precision freeform surface in a first specific spatial shape and a to-be-corrected surface;

adding a non-glass material layer onto the to-be-corrected surface of the glass part to produce an accurate second surface in a second specific spatial shape that is different from the initial surface shape;

applying an optical coating to the precision freeform surface of the glass part in the two-part freeform optical element.

2. The method of claim 1, further comprises applying a second optical coating to the accurate second surface of the two-part freeform optical element.

3. The method of claim 2, wherein the second optical coating represents an anti-reflection coating.

4. The method of claim 1, wherein the optical coating is coated at a temperature above what the non-glass material layer is able to maintain its spatial form.

5. The method of claim 1, wherein the optical coating represents a wavelength selective coating.

6. The method of claim 1, wherein the non-glass material is of an optical refractive index matching that of the glass part.

7. The method of claim 1, wherein the two-part freeform optical element is incorporated into an imaging system used by a viewer.

8. The method of claim 7, wherein the imaging system represents a wearable device used to support seeing-through and spectral multiplexed imaging applications.

9. The method of claim 7, wherein the precision freeform surface represents an interior surface relative to the viewer; wherein the accurate second surface represents an exterior surface relative to the viewer.

10. The method of claim 1, wherein the precision freeform surface is produced by a glass molding process.

11. The method of claim 1, wherein the precision freeform surface is produced by a glass polishing process.

12. The method of claim 1, wherein the two-part freeform optical element operates with an image rendering device to use light reflected from the precision freeform surface to render images in one of: a mixed reality application, an augmented reality application, a virtual reality application, a computer gaming application, a cinema display application, or a video display application.

13. A display system, comprising:

a device image display that outputs device display light for rendering device display images;

an optical configuration to see through transmissive light and to perform wavelength selection with respect to the device display light;

wherein the optical configuration includes the two-part freeform optical element as recited in claim 1.

14. A non-tangible computer readable storage medium, storing software instructions, which when executed by one or more computer processors cause performance of at least a part of the methods recited in claim 1.

15. An apparatus comprising one or more computer processors and one or more storage media storing a set of instructions which, when executed by the one or more computer processors, cause performance of at least a part of the method recited in claim 1.

* * * * *